(12) United States Patent
Wang

(10) Patent No.: US 7,323,677 B1
(45) Date of Patent: Jan. 29, 2008

(54) FIBER-BRAGG GRATING-LOOP RINGDOWN METHOD AND APPARATUS

(75) Inventor: Chuji Wang, Starkville, MS (US)

(73) Assignee: Mississippi State University, Mississippi State, MS (US)

( * ) Notice: Subject to any disclaimer, the term of this patent is extended or adjusted under 35 U.S.C. 154(b) by 116 days.

(21) Appl. No.: 11/181,798

(22) Filed: Jul. 15, 2005

Related U.S. Application Data

(60) Provisional application No. 60/588,035, filed on Jul. 15, 2004.

(51) Int. Cl.
*G01J 1/04* (2006.01)
*G01J 1/42* (2006.01)
*G01J 5/08* (2006.01)

(52) U.S. Cl. .................. 250/227.14; 385/12; 385/13

(58) Field of Classification Search ............ 250/227.14, 250/227.16, 227.18, 227.23, 237 G, 237 R; 385/12–13
See application file for complete search history.

(56) References Cited

U.S. PATENT DOCUMENTS

| | | | |
|---|---|---|---|
| 5,528,040 A | 6/1996 | Lehmann | |
| 6,542,228 B1 * | 4/2003 | Hartog | ............. 356/73.1 |
| 6,563,970 B1 | 5/2003 | Bohnert et al. | |
| 7,241,986 B2 * | 7/2007 | Wang | ............. 250/227.14 |
| 2001/0022804 A1 | 9/2001 | Helmig et al. | |
| 2002/0125413 A1 * | 9/2002 | Saini | ............. 250/227.14 |
| 2003/0072005 A1 | 4/2003 | Tsao et al. | |
| 2003/0169956 A1 * | 9/2003 | Lange et al. | ............. 385/12 |
| 2004/0118997 A1 * | 6/2004 | Lehmann et al. | ...... 250/227.14 |
| 2005/0103988 A1 * | 5/2005 | Wang | ............. 250/227.14 |
| 2006/0163457 A1 * | 7/2006 | Katsifolis et al. | ...... 250/227.14 |

OTHER PUBLICATIONS

Romanini, D., et al., "CW cavity ring down spectroscopy", Chemical Physics Letters, vol. 264, pp. 316-322, 1997.
Pipino, Andrew C.R., et al., "Evanescent wave cavity ring-down spectroscopy with a total-internal-reflection minicavity", Rev. Sci. Instrum., vol. 68, No. 8, pp. 2978-2989, Aug. 1997.
Von Lerber, Tuomo, et al., "Cavity-ring-down principle for fiber-optic resonators: experimental realization of bending loss and evanescent-field sensing", Applied Optics, vol. 41, No. 18, pp. 3567-3575, Jun. 20, 2002.
Gupta, Manish, et al., "Cavity-enhanced spectroscopy in optical fibers", Optics Letters, vol. 27, No. 21, pp. 1878-1880, Nov. 1, 2002.
Stewart, George, et al., "An investigation of an optical fibre amplifier loop for intra-cavity and ring-down cavity loss measurements", Meas. Sci. Technol., vol. 12, pp. 843-849, 2001.

(Continued)

*Primary Examiner*—Patrick J. Lee
(74) *Attorney, Agent, or Firm*—DLA Piper US LLP

(57) ABSTRACT

A device comprising a fiber grating loop ringdown (FGLRD) system of analysis is disclosed. A fiber Bragg grating (FBG) or Long-Period grating (LPG) written in a section of single mode fused silica fiber is incorporated into a fiber loop. By utilizing the wing areas of the gratings' bandwidth as a wavelength dependent attenuator of the light transmission, a fiber grating loop ringdown concept is formed. One aspect of the present invention is temperature sensing, which has been demonstrated using the disclosed device. Temperature measurements in the areas of accuracy, stability, high temperature, and dynamic range are also described.

14 Claims, 11 Drawing Sheets

OTHER PUBLICATIONS

Brown, R. Stephen, et al., "Fiber-loop ring-down spectroscopy", Journal of Chemical Physics, vol. 117, No. 23, pp. 10444-10447, Dec. 15, 2002.

Tarsa, Peter B., et al., "Abstract 177: Passive optical fiber resonator for cavity ring-down spectroscopy", 224th ACS National Meeting, Aug. 18-22, 2002 Boston, MA.

Tarsa, Peter B., et al., "Single-cell detection by cavity ring-down spectroscopy", Applied Physics Letters, vol. 85, No. 19, pp. 4523-4525, Nov. 8, 2004.

Wang, Chuji, et al., "Fiber loop ringdown for physical sensor development: pressure sensor", Applied Optics, vol. 43, No. 35, pp. 6458-6464, Dec. 10, 2004.

Mizunami, Toru, et al., "High-sensitivity cryogenic fibre-Bragg-grating temperature sensors using Teflon substrates", Measurement Science and Technology, vol. 12, pp. 914-917, 2001.

Shen, Yonghang, et al., "Fiber-optic sensor system for heat-flux measurement", Review of Scientific Instruments, vol. 75, No. 4, pp. 1006-1008, 2004.

Pal, Suchandan, et al., "Strain-independent temperature measurement using a type-I and type-IIA optical fiber Bragg grating combination", Review of Scientific Instruments, vol. 75, No. 5, pp. 1327-1331, 2004.

Trpkovski, S., et al., "High-temperature-resistant chemical composition Bragg gratings in $Er_{3+}$-doped optical fiber", Optics Letters, vol. 30, No. 6, pp. 607-609, Mar. 15, 2005.

Zhu, Yizheng, et al., "Sapphire-fiber-based white-light interferometric sensor for high-temperature measurements", vol. 30, No. 7, pp. 711-713, Apr. 1, 2005.

Wan, Xiaoke, et al., "Intrinsic fiber Fabry-Perot temperature sensor with fiber Bragg grating mirrors", Optics Letters, vol. 27, No. 16, pp. 1388-1390, Aug. 15, 2002.

Wang, Chuji, "Fiber ringdown temperature sensors", Optical Engineering, vol. 44, No. 3, pp. 030503-1-030503-2, Mar. 2005.

James, Stephen W., et al., "Optical fibre long-period grating sensors: characteristics and application", Meas. Sci. Technol., vol. 14, pp. R49-R61, 2003.

Grattan, K.T.V., "Many hands make light work'- a perspective on optical fiber from communications to measurement and sensing", Optical Fiber Sensor Technology, vol. 4, pp. 1-25, 1998.

Greenwood, J., et al., "An optical pressure sensor for an aeronautical application using white light interferometry", Proceedings of SPIE-the International Society for Optical Engineering, vol. 4075, pp. 94-100, 2000.

Wang, Chuji, et al., "Fiber ringdown pressure sensors", Optics Letters, vol. 29, No. 4, pp. 352-354, Feb. 15, 2004.

O'Keefe, Anthony, et al., "Cavity ring-down optical spectrometer for absorption measurements using pulsed laser sources", Review of Scientific Instruments, vol. 59, No. 12, pp. 2544-2551, 1988.

Paldus, B.A., et al., "Laser diode cavity ring-down spectroscopy using acousto-optic modulator stabilization", J. Appl. Phys., vol. 82, No. 7, pp. 3199-3204, Oct. 1, 1997.

Grattan, K.T.V., et al., "Fiber Bragg Grating", Academic Press, pp. 1999-2003, 1999.

* cited by examiner

US 7,323,677 B1

FIBER-BRAGG GRATING-LOOP RINGDOWN METHOD AND APPARATUS

This application claims priority from U.S. Provisional Application Ser. No. 60/588,035 filed Jul. 15, 2004. The entirety of that provisional application is incorporated herein by reference.

This invention was made with Government support under DE-FC01-04EW54600 awarded by the U.S. Department of Energy. The Government may have certain rights in the invention.

BACKGROUND OF THE INVENTION

1. Field of the Invention

This invention relates to a method and apparatus for temperature sensing using fiber grating loop ringdown (FGLRD), in which a fiber-Bragg grating (FBG) or Long-Period grating (LPG) serves as the sensing element which determines temperature by measuring change of a time constant (i.e., ringdown time) when the element is exposed to temperature changes.

2. Related Art

Optical fiber sensors are superior to the conventional electrical-based sensors in many aspects: a) optical fiber sensors are inexpensive, compact, light weight, and immune to electromagnetic interference; and b) when employed in the measuring environment, they do not generate electrical hazards [1]. In recent years, the development of fiber optic temperature sensors has been mainly based on the interference concept, such as the fiber Fabry-Perot interference (FFPI). There are several methods to design and fabricate an FFPI cavity in order to enhance detecting and reduce costs, but the basic principle remains the same: external changes of temperature induce variations of the fiber refractive index, fiber length, or both, thereby the resultant phase shift of the two coherent light beams changes. The temperature is measured through processing the interference patterns [4,5]. Another type of fiber temperature sensor based on fiber-Bragg gratings (FBGs) has recently emerged [18]. With these sensors, either a single grating or multiple gratings are written on a small section of the fiber. When the wavelength of the light source injected into the fiber satisfies the Bragg condition, the light of this wavelength is strongly reflected while the light of other wavelengths is transmitted. Both the FFPI temperature sensors and the FBG-based temperature sensors mentioned above are based on measuring the change of the light intensity to determine temperature. The disadvantages of the FFPI sensors include the costly and complicated fabrication of the interference cavity. Furthermore, the interference cavity, typically coated with chemicals, cannot survive in high temperature or chemically corrosive measuring environments. In order to increase the measurement accuracy these types of sensors take long integration time to process the interference patterns. The disadvantages of the current FBG sensors are low measurement accuracy and small measuring dynamic range. The measurement accuracy is limited by both the spectral bandwidth of the FBG and the spectral resolution of an optical spectral analyzer (OSA) or spectrometer. An OSA or spectrometer of high spectral resolution is often very expensive. The measurement accuracy of a typical FBG sensor using a bare single mode fiber is only ~1° C. Alternatively, such sensors must use an expensive high resolution OSA and/or employ special fiber materials in order to improve the measurement accuracy of the device. Moreover, currently available products based on bare FBGs can only measure up to 200-300° C. Therefore, it is of great interest to explore new methods to develop fiber optic temperate sensors to be of low cost and high measurement accuracy, yet possess large measuring dynamic range.

Since its introduction [4], the cavity ringdown (CRD) technique has gained rapid development. The new ideas and the latest technologies have prompted the evolution of the cavity ringdown spectroscopy (CRDS) technique from the initial mirror-based CRD [4] to the reflection-based prism-CRD [5,6] and fiber end-coated CRD, as well as the very recently developed fiber-Bragg grating CRD [7,8,9]. Although the cavity configurations are different, all of these CRD techniques can be classified as the high finesse cavity-based CRDs. Thus far, no documentation has been discovered that indicates these CRD techniques have been utilized for physical sensor development, partially due to practicality considerations resulting from the delicate and expensive coatings/polishing of the optical cavity. In the last couple of years, a new type of CRD technique, fiber loop ringdown (FLRD), has emerged. This technique adopts the CRD concept, but does not require the use of a high reflectivity mirror. Stewart et al. [11] first reported their work three years ago, in which a complicated fiber loop configuration was developed for a direct gas phase ringdown absorption measurement. Recently, Loock's [12,13] group advanced this technique using a simplified approach with a micro air-gap fabricated in the loop for liquids detection. Also, Lehmann et al. [14,15] explored FLRD for the detection of liquid samples based on evanescent field absorption. Research and development of this newly emerged FLRD technique itself is just at the starting point; measurements using the FLRD technique have been, thus far, limited to spectroscopic measurements or chemical sensing, e.g., detecting small volumes of liquids. However, owing to it ruggedness, low cost, and versatility, a variety of application potentials of the FLRD can be expected, including, but not limited to, development of FLRD systems and apparatus for physical sensor development [4, 5, 16, 23].

FBG has been incorporated into a section of optical fiber for FBGs CRD spectroscopic study [12]. In that technique (FBGCRD), two FBGs are written in a section of optical fiber to form a cavity. A laser beam is emitted into the cavity through one FBG and leaks into a detector through the other FBG. At the Bragg wavelength region, due to the high reflectance of the FBGs, the light travels between the two FBGs. However, FBGs used in this manner function only to replace the pair of high reflectivity mirrors employed in the mirror-based CRD.

U.S. Pat. No. 6,563,970 provides a method and apparatus for a pressure sensor with a fiber-integrated fiber-Bragg grating system, also comprising a fiber-integrated fiber-Bragg grating temperature sensor. Additional methods for using fiber optic based temperature measurement have been described by Christian, et al. (U.S. App. No. 2001/0022804) and Tsao, Shyh-Lin, et al. (U.S. App. No. 2003/0072005).

3. Background of the Technology

Optical fiber temperature sensors offer unique advantages over the electrical-based temperature sensors in the following aspects: optical fiber-based temperature sensors do not generate electromagnetic hazards, have a large volume of data throughput, and facilitate easy site deployment and maintenance. There are a variety of approaches to develop optical fiber-based temperature sensors [1]. Typical methods currently employed can be classified into two major categories: the chemical-based and the physical-based. The former includes using chemical coating, chemical fluorescence, and chemical doping; the latter includes utilizing the Fabry-Perot interference (FFPI) (2) and the fiber-Bragg gratings (FBGs) (3). Due to the non-chemically related measuring mechanism and the high detection sensitivity, the physical-based temperature sensors, such as FFPI and FBGs sensors, are very attractive in real applications. However, in extreme environment applications (e.g., NASA/space deployment), where the temperature measurements are performed under extremely harsh conditions, high pressure (~8000 psi), high velocity fluids, very limited deployment space (e.g., a pipe of 8-10 inches inner diameter), and extreme temperatures (−170° C. to 500° C.), the FFPI and FBG temperature sensors become less practical. The FFPI-based temperature sensors cannot survive in the special measuring environments due to the chemical coating used in the FFPI cavity. The FBG-based temperature sensors measure the reflected spectral patterns to determine the temperature; the sensitivity and the accuracy totally depend upon the grating bandwidth and the resolution of a spectral analyzer. One of the significant limitations of the FBGs sensors is the low temperature accuracy which is limited by the spectral resolution of the OSA. Furthermore, the temperature measuring range of the FBG-based temperature sensors utilize an optical spectral analyzer (OSA), which is typically rather expensive, for the data processing, and the time response is relatively slow (>>400 ms).

Temperature sensors to be used, for example, in large rocket engine testing, must be non-intrusive, chemically clean, free of generating electromagnetic hazards, and capable of operating in extreme pressure and temperature environments. In many other applications, fiber optical temperature sensors are required to be of high measurement accuracy, fast response, low cost, as well as large dynamic measuring range.

The present invention satisfies these needs, as well as others.

SUMMARY OF THE INVENTION

The present invention discloses a method of fiber grating loop ringdown (FGLRD) and apparatus including one or more fiber grating ringdown loops for temperature sensing in which a fiber Bragg-grating (FBG) or a long period grating (LPG) serves as the sensing element and is exposed to temperature changes. Conceptually different from current FBG-based temperature sensors, the temperature sensors based on the methods and apparatus as disclosed in the present invention senses temperature by measuring a time constant, namely, ringdown time. An FBG or LPG written in a section of single mode fiber, which forms a fiber grating loop, utilizes the broad wing areas (i.e., high transmission, rather than high reflectance of the FBG) of the grating's bandwidth as a wavelength dependent attenuator of the light transmission, taking into account particular levels of transmission rates. In this way, an FGLRD apparatus is formed. The unique feature of the temperature sensor is that it measures time constants (ringdown times) to determine temperatures. The potential advantages of the FGLRD temperature sensors as disclosed in the present invention over current optical fiber temperature sensors is high accuracy/sensitivity, large measuring dynamic range, high pressure tolerance, and low costs.

In one embodiment, an apparatus is disclosed which includes a coherent light source, a first coupler configured to receive light from the light source, a second coupler, a detector connected to the second coupler, a data acquisition system connected to the detector, and a first fiber grating, where the first and second couplers are in optical communication with each other along one or more light paths, and wherein at least one light path comprises the first fiber grating, the light paths being configured such that a fiber grading ringdown loop is formed between the first and second coupler.

In another related aspect, the grating is a fiber-Bragg grating (FBG) or a long period grating (LPG).

Further, the apparatus may include couplers which are fiber optic couplers and an adaptor which is a fiber optic adaptor. Moreover, the coherent light source includes, but is not limited to, a temperature controlled diode laser, external cavity diode laser, continuous pulse laser, or quantum cascade laser.

In another related aspect, the reflectance of a grating may be from about 10% to about 99.999%, where the reflectance of the grating is wavelength dependent. In a further related aspect, the transmittance of a grating may be from about 10% to about 99.999%, where the transmittance of the grating is wavelength dependent. In a further related aspect, the grating bandwidth can be from 0.05 nm to 100 nm, 0.05 nm to 150 nm, or 0.05 nm to 200 nm.

Further, each of the two fiber couplers may be a 2×1, 2×2, 3×1, 3×2, or 4×1 fiber coupler, and the device may possess two or more couplers, where couplers are of similar structure or differing structure. In a related aspect, each fiber coupler may have a fiber coupler tap ratio range from about 1:99 to about 99:1.

In another related aspect, the two sections of optical fiber may comprise a single mode fiber or multiple mode fiber. For example, the two sections of optical fiber may comprise a single mode fiber or the two sections of optical fiber may comprise a multiple mode fiber, where the fibers can be made of different materials. Moreover, the fiber couplers and the optical fibers may be spliced together to form two or more fiber loops.

In one aspect, a section of the fiber loop containing the grating serves as a probe. Further, the apparatus may include two or more FBGs or LPGs. Moreover, the apparatus may contain two or more fiber grating loops.

In another aspect, the detector is a photodetector, a photomultiplier tube (PMT), a charge coupled device (CCD), or a detector array.

In a related aspect, the data acquisition system receives data from the detector, where for example, the data acquisition system and the detector are directly coupled electrically or indirectly coupled via telemetry.

In one aspect, the apparatus determines temperature, pressure, strain, and ultrasonic waves by measuring the ringdown time resulting from the shift of the bandwidth curve of the fiber grating, when the fiber grating is exposed to sources exhibiting variations in temperature, pressure, strain, or ultrasonic waves. Further, the apparatus determines temperature or the apparatus may determine temperature and simultaneously monitor variations in pressure and strain. In a related aspect, the apparatus has a temperature measuring range between about −196° C. to about 2200° C. and has a pressure measuring range between about 1,500 psi to about 15,000 psi.

In another aspect, the apparatus may comprise two or more gratings in the fiber loop.

In another embodiment, a method of determining temperature by measuring FGLRD time is envisaged including exposing the grating of the apparatus described above to an environment which exhibits variation in temperature, where the coherent light is tunable, emitting a light pulse into the first fiber grating ringdown loop and measuring an observed ringdown time for the light pulse, and where the tuning results in modulating different sensing properties, including measurement accuracy, sensitivity, and/or dynamic measuring range.

In a further related aspect, the ringdown time ($\tau$) is calculated by $$\tau = \frac{nL}{cA'}\left(1 - \frac{\beta(\lambda)}{A'}T\right)$$

where T is a given temperature, $\lambda$ is a fixed laser wavelength, $\tau$ is the ringdown time, L is the total fiber length, c is the speed of light in a vacuum, n is the refractive index of the fiber, A' is the addition of the total loss in each round trip and the fiber-to-fiber splice losses at the two connection points, and $\beta(\lambda)$ is the wavelength dependent temperature coefficient of the grating induced insertion loss.

Further, the ringdown signal ($\tau$) is measured by a detector and the ringdown time is calculated by a data acquisition system.

In another embodiment, a thermally-stabilized LPG is envisioned, where the bandwidth curve of the LPG is permanently modified.

In further embodiment, a method of thermally-stabilizing a long period grating (LPG) is envisaged, including heating an LPG from about 21° C. to about 995° C. and cooling the heat exposed LPG from about 995° C. to about 21° C., where the heating and cooling permanently modifies the bandwidth curve of the LPG.

In a related aspect, the bandwidth curve is modified to be permanently redshifted or blueshifted.

Exemplary methods and compositions according to this invention are described in greater detail below.

DETAILED DESCRIPTION OF THE INVENTION

Figure 1:
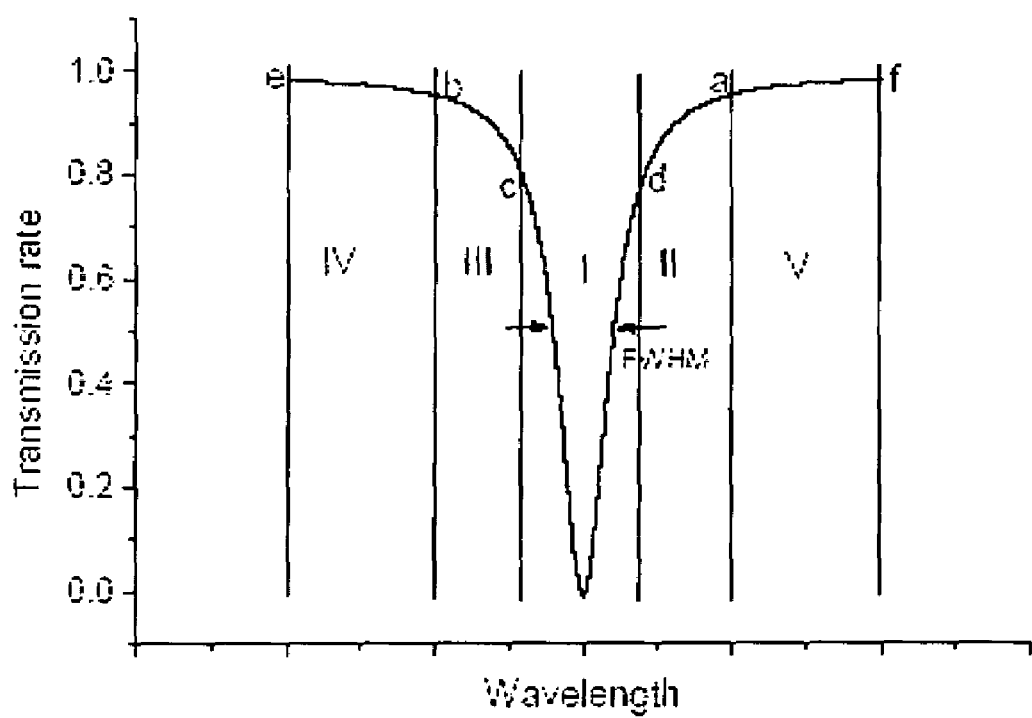
FIG. 1 is a conceptual illustration of an FBG's spectral response curve, which is divided into five zones: Zones I to V. Points a through f mark six typical different locations in the bandwidth curve. No specific wavelength is labeled in the x-axis.

Before the present components and methods are described, it is understood that this invention is not limited to the particular methodology, protocols, devices, and/or apparatus described as these may vary. It is also to be understood that the terminology used herein is for the purpose of describing particular embodiments only, and is not intended to limit the scope of the present invention which will be described by the appended claims.

It must be noted that as used herein and in the appended claims, the singular forms "a", "an", and "the" include plural reference unless the context clearly dictates otherwise. Thus, for example, reference to "a coupler" includes a plurality of such couplers, reference to "a light source" includes one or more light sources and equivalents thereof known to those skilled in the art, and so forth.

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention, the methods, devices, and apparatus are now described. All publications mentioned herein are incorporated herein by reference for the purpose of describing and disclosing an apparatus, device, and methodologies which are reported in the publications which might be used in connection with the invention. Nothing herein is to be construed as an admission that the invention is not entitled to antedate such disclosure by virtue of prior invention.

As used herein, "optical communication," including grammatical variations thereof, means a process by which light is exchanged between components. For example, in one embodiment, a first and second optical coupler can be in optical communication with each other by open-air exchange of light or by exchange through an optical fiber.

"Ringdown" has gradually expanded from its original spectral concept (cavity ringdown spectroscopy (CRDS)) and become a general means—time constant measurement, for non-spectroscopic applications. For example, a fiber loop ringdown, originally introduced for spectroscopic measurements (13-15), has been extended for the development of physical sensors, such as fiber loop ringdown pressure sensors (4,5,16). In fiber loop ringdown, an optical fiber loop serves as the conceptual ringdown "cavity". Light radiation is coupled into the fiber loop; and when the light source is rapidly shutoff, the resultant light rings inside the fiber loop for many round trips. In each round trip, a small fraction of light leaks into a photodetector through a fiber coupler; and the rest of the light rings in the fiber experiencing internal fiber transmission losses. The signal intensity observed by the detector follows an exponential decay. The lower are the losses of the light in the fiber, the longer is the decay time constant (ringdown time). When an external action, such as absorption, evanescent wave field interaction, and change of pressure, temperature, and/or strain, is applied to a small section of the fiber, the observed ringdown time decreases.

Fiber grating ringdown temperature sensors are based on the fiber grating loop ringdown (FGLRD) technique, in which a fiber grating, either a fiber Bragg grating (FBG) or a long period grating (LPG), is utilized as the sensing element to convert the temperature measurements into a time domain—measuring ringdown time to sense temperature. In one embodiment, an FBG serves as the sensing element (wherein sensor head, sensing element, or sensor probe can be used interchangeable) for a temperature sensor device. In another embodiment, an LPG serves as the sensing element for a temperature sensor device.

Principle of the Method in the Invention

FIG. 1 illustrates a typical FBG's spectral response curve, or bandwidth curve, which is divided into five different zones: Zone I, Zone II, Zone II, Zone IV, and Zone V, based on different transmission rates. An FBG can function as a narrow band, wavelength dependent attenuator of light transmission. When a laser beam travels through the FBG and the wavelength meets the Bragg condition, e.g., in Zone I, the light reflects back with a reflectance rate of up to 99% depending on the specifications of the FBG. Similarly, if the laser wavelength is tuned out of the bandwidth curve of the FBG, e.g., in Zones IV and V, the laser transmits through the FBG with a transmittance rate of up to, or even higher than, 99%. If the laser wavelength is tuned to any other position in the bandwidth curve, e.g., Zones II and III, the laser beam then partially transmits, and the transmittance rate is determined by the position of the laser wavelength in the bandwidth curve of the FBG. When the FBG is spliced as a part of the fiber loop, additional fiber transmission losses attributable to the fiber spliced insertion loss and FBG induced insertion loss are added to the total light transmission loss in the fiber loop. The fiber induced insertion loss depends on the fabrication of the fiber loop, and the total light transmission loss depends on the specifications of the FBG and the position of the laser wavelength used in the spectral response curve. Detailed transmission losses of the fiber loop are listed in Table 1.

TABLE 1

Specifications of losses of the fiber loop using fused silica single mode fiber[#]

| Type of Loss | Loss (dB) |
| --- | --- |
| Coupler excess loss | 0.04 |
| Coupler ratio, 1% | 0.04 |
| Fiber splicing loss | 0.02 |
| 65-meter fiber loss | 0.02 (>0.3 dB/km at 1650 nm) |
| 61-meter fiber loss | 0.02 (>0.3 dB/km at 1650 nm) |
| Connector loss | 0.2 |
| FBG insertion Loss | |
| FGB (#1) | <7.9 (at the peak, 1566.80 nm) |
|  | <1 (in Zones II & III) |
| FBG (#2) | <8.9 (at the peak, 1567.66 nm) |
|  | <1 (in zones II & III) |
| LPG insertion loss | |
| LPG (#1) | <6.8 (at the peak, 1527 nm) |
|  | <1 (Zones II & III) |
| LPG (#2) | <6.4 (at the peak, 1522 nm) |
|  | <1 (in Zones II & III) |
| Total fiber scattering loss | 0 |
| Total loss | 2 (0.04 + 0.04 + 0.02) + 0.02 + 0.20 + 1 < 0.42 |

[#]SMF-28, O.D. = 125 μm in cladding

When the relative positions of the laser wavelength in the bandwidth curve are located in Zones II and III, where the FBG related insertion loss is low, e.g., (<1 dB, for the FBG described in the example below) a fiber Bragg loop ringdown concept can be established. In contrast, excessive optical transmission loss results in no ringdown event when the position of the laser wavelength is located in Zone I, as shown in FIG. 1.

The ringdown behavior was modeled by assuming exponential decay of the light pulse by:

$$\frac{dI}{dt} = -\frac{I(A+B)c}{nL}$$

where I is the light intensity at time t, L is the total fiber length, c is the speed of light in the vacuum, and n is the refractive index of the fiber. A is the total loss in each round trip including the fiber loop absorption loss and the fiber couplers' insertion losses (the low scattering loss at 1567 nm is negligible, see Table 2).

$A=\alpha L+E$, where $\alpha$ is the wavelength dependent absorption coefficient for the fiber core material with units of, e.g., $cm^{-1}$ and E is the total insertion loss of the fiber couplers. B is the total grating insertion loss, which includes the fiber-to-fiber spliced losses ($B_0$) at the two connection points and the FBG induced insertion loss ($B_1(\lambda)$). $B=B_0+B_1(\lambda)$, where $B_1(\lambda)=\beta(\lambda)T$ and $\beta(\lambda)$ is the wavelength dependent temperature coefficient of the grating induced insertion loss. At a given laser wavelength, $\beta(\lambda)$ is approximately a constant with units of $T^{-1}$. The solution of Equation (1) describes the temporal behavior of the light intensity observed from the detector:

$$I = I_0 e^{-\frac{c}{nL}(A+B)t}$$

The time required for the light intensity to decrease to 1/e of the initial light intensity observed by the detector, is referred to as ringdown time, $\tau_0$, and is given by $$\tau_0 = \frac{nL}{c(A+B)}$$

For a fixed laser wavelength, $\lambda$, at a given temperature, $T_0$, the ringdown, $\tau_0$ is a constant, which characterizes the physical properties of the fiber Bragg grating loop, such as the total length of the loop (L), the averaged-refractive index (n), the total optical transmission loss (A+B), the grating induced insertion loss at this wavelength (B), and the round trip time of the laser beam in the loop, tr=nL/c.

Rearranging Equation (3):

$$\tau_0 = \frac{nL}{c(A+B_0+B_1(\lambda))} = \frac{nL}{c(A'+B_1(\lambda))} (A' = A+B_0)$$

When the grating induced insertion loss, $B_1(\lambda)$, is much smaller than A', Equation (4) can be expressed using the first order approximation, $$\tau_0 = \frac{nL}{cA'}\left(1 - \frac{\beta(\lambda)}{A'}T_0\right)$$

At a given temperature, $T_0$ and a fixed laser wavelength, $\lambda$, the ringdown time, $\tau_0$, is a constant, which characterizes the physical properties of the fiber-Bragg grating loop, such as the total length of the loop, the refractive index, the total insertion loss, and the grating induced insertion loss at the wavelength.

The Bragg wavelength of an FBG is given as $\lambda_B=2n\Lambda$, where n is the refractive index of the fiber core and $\Lambda$ is the grating period. For a given temperature variation, both n and $\Lambda$ change the resultant Bragg wavelength and the whole bandwidth curve shift. The spectral response of the FBG to changes in temperature is described as:

$$\Delta\lambda=\lambda_B(\alpha+1/n\ dn/dT)\Delta T,$$

where $\Delta\lambda$ is the wavelength shift of the Bragg wavelength, $\lambda_B$, resulting from the FBG's temperature increase, $\Delta T$; $\alpha$ is the thermal expansion coefficient and dn/dT is the change rate of the fiber refractive index.

Typically, a temperature increase shifts the Bragg wavelength and the entire bandwidth curve to the longer wavelength side. In a related aspect, for an FBG written on a bare fused silica single mode fiber (typically, a few centimeters in length, and 125 μm in diameter), which has a thermal expansion coefficient of ~0.55×10$^{-6}$ C.$^{-1}$ and dn/dT ~9.1×10$^{-6}$ C.$^{-1}$ (n is ~1.4469 at room temperature), the shifting rate of the bandwidth curve of the FBG is in the range of 0.008-0.03 nm/° C., depending on the fabrication of the FBG. In a related aspect, higher temperature measurements can be achieved using fiber materials other than silica (e.g., see 18).

For a given laser wavelength, the shift of the spectral response curve resulting from the temperature variation changes the relative position of the laser wavelength in the bandwidth curve; i.e., from point a at room temperature to point d at high temperature, thus, the light transmission loss (the parameter B in Equation (3)) incurred in the FBG changes, which changes the observed ringdown time from $\tau_0$ to $\tau$. That is the basic principle of the method present in the instant invention: i.e., how the temperature sensing is achieved by measuring the ringdown time in FGLRD.

In a related aspect, the concept of the FGLRD temperature sensors described for the FBG can be analogously applied to a sensor unit in which an LPG is incorporated into a fiber loop as the sensing element. In further related aspect, an LPG is typically more sensitive that an FBG and the LPG has a large spectral bandwidth (full width at half maximum (FWHM)), which can be constructed up to 70 nm. The thermal sensitivity of an LPG is dependent upon the combination of the composition of the optical fiber, the order of the cladding modes, and period of the grating. In a related aspect, by manipulating the combination effect of the three factors, the LPG can be specifically constructed to have positive, negative, or zero sensitivity to temperature variations as well as to other parameters. For example, for an LPG with long periods (i.e., >100 μm), in which a lower order cladding mode is coupled, the grating typically has a positive thermal sensitivity, namely, the increase of the grating temperature redshifts the bandwidth curve. In one embodiment, two LPGs are written on a silica single mode fiber, where the thermal properties are such that the thermal sensitivity is 0.03-0.1 nm/° C.

The following examples are intended to illustrate but not limit the invention.

EXAMPLES

Example 1

Materials and Methods

Figure 2:
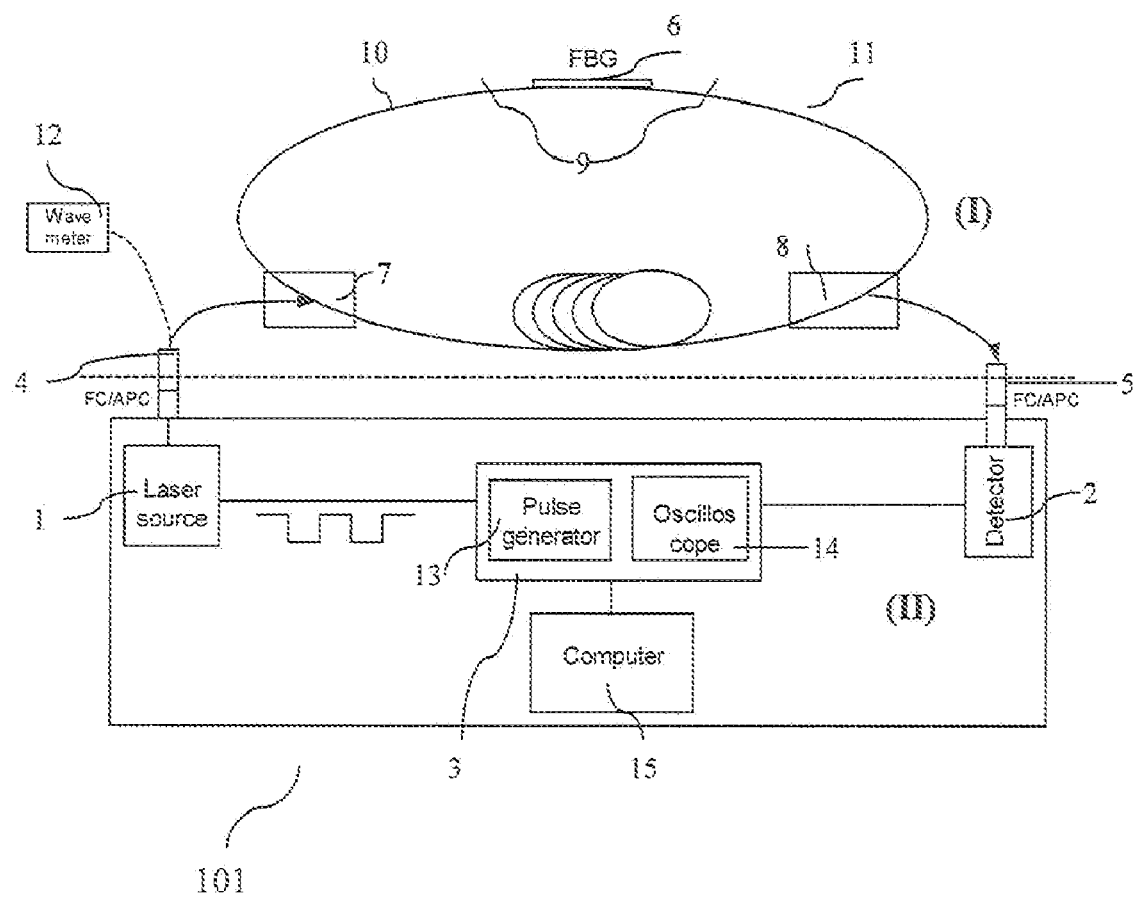
FIG. 2 shows a schematic of a typical fiber grating loop ringdown temperature sensor. Section I: the fiber grating loop with an FBG as the sensing element; Section II: the sensor's control portion, which includes a diode laser source, a photodetector, electronics, and a laptop computer. The two sections are connected by FC/APC fiber connectors. The same system is applicable to the sensor using an LPG as the sensing element.

The fiber ringdown temperature sensor device, 101 (FIG. 2), consists of two major parts: a fiber loop and an electronic control portion, 3, that includes a light source, 1, and a detector, 2. These two parts are connected together through two FC/APC fiber connectors, 4, 5, as sketched in FIG. 2. The fiber loop consists of a commercial bare fiber grating, 6, (an FBG or an LPG) that is written in a section of bare fused silica single mode fiber, 9, (O/E-land), two identical 2×1 fiber couplers, 7,8 (Lightcomm Technology), and two sections of fused silica single mode fiber, 10,11 (Corning SMF 28). The quoted split ratio in the 2-leg end of the fiber couplers, 7,8, is 1:99. The two 1-leg ends of the couplers are spliced together; and the two 99% legs of the two couplers are separately spliced with the two ends of the fiber on which a grating is written to form the fiber grating loop (FITEL S321, Optical fiber Cleaver; Ericsson 925, Fusion Splicer). The light source, 1, from a single mode fiber of the pig-tailed laser diode (NEL America, NLK1U5E1AA, 1567±1.5 nm) is split into two components (50/50). One component is input into a wavemeter, 12, (WA-1500, Burleigh) to simultaneously monitor the laser wavelength. The other component is coupled into the fiber loop through the 1% leg with a first coupler, 7. The 1% leg of the second coupler, 8, is coupled to an amplified InGaAs photodetector, 2, (Thorlabs, PDA 400). The total length of the loop was initially 61 meters; the experiment was later modified and fiber was cut and spliced several times, so that the fiber length of the loop was 56 meters. Two FBGs were used in the experiment. The first FBG was centered at 1566.80 nm with a quoted reflectivity of 83.9% (corresponding to 7.9 dB transmission loss) and FWHM of 0.25 nm. The second FBG was centered at 1567.66 nm with a quoted reflectivity of 87% (8.9 dB transmission loss) and FWHM of 0.2 nm. The specifications of the FBG are listed in Table 2.

TABLE 2

Specifications of the FBG

| Type of loss | Loss (dB) |
|---|---|
| Bragg central wavelength | 1567 nm |
| Reflectance at 1567 | 83.9% |
| FBG bandwidth | 0.25 nm |
| Fiber splicing loss | 0.02 |
| 61-meter fiber loss | 0.02 (>0.2 dB/km at 1567 nm) |
| Total fiber scattering loss | 0 |

Two LPGs were also used. The two LPGs were centered at 1522 nm and 1527 nm with reflectivity (or attenuation rate) of 77% and 79% (corresponding to 6.4 dB and 6.8 dB transmission loss), respectively; both have a custom-designed bandwidth of approximately 50 nm.

The actual testing data show that the specifications of the two LPGs are slightly different in terms of the central wavelength, band width, reflectivity, which are listed in Table 3.

TABLE 3

Specifications of the two long period gratings (LPGs).

| | Requirements | | Measured Result | | |
|---|---|---|---|---|---|
| Parameters | S/N 68-1 | S/N 68-2 | S/N 68-1 | S/N 68-2 | Units |
| Band width (FWHM) | 50 ± 2 | 50 ± 2 | 49.28 | 49.72 | nm |
| Central Wavelength | 1530 | 1530 | 1522.07 | 1517.35 | nm |
| Fiber length | 2 | 2 | 2 | 2 | m |
| Fiber type | SMF-28 | SMF-28 | SMF-28 | SMF-28 | |
| Grating length | 2 | 2 | 2 | 2 | cm |
| Recoating | no | no | no | no | |
| Reflectivity | 70 ± 10 | 70 ± 10 | 79.9 | 79.2 | % |
| Tubing | no | no | no | no | |
| Connector | no | no | no | no | |

The quoted insertion loss of each fiber coupler is less than 0.2 dB. The typical fiber-to-fiber spliced insertion loss is approximately 0.03 dB and is estimated by the fiber splicer. The absorption loss rate of the fiber is 0.2 dB/km at 1550 nm and slightly higher at 1567 nm. Detailed transmission losses of the fiber loop are listed in Table 1 (above).

Electrical control is discussed below. Briefly, when the CW laser beam from the diode laser was coupled into the fiber loop, the detector observed a signal. This signal was then applied to a pulse generator, 13, (SRS DG 535) to trigger the generator to generate a series of negative square waves (2.5 V and 10 Hz) and this pulsed series was then applied to the diode laser driver to rapidly drop the laser current to zero. Therefore, a series of laser pulses was generated. For each laser pulse, the detector observed a series of pulsed spikes resulting from each round trip of the laser pulse in the fiber loop. The intensity decay curve was monitored by an oscilloscope, 14, (Tektronix 460 A), which was interfaced to a laptop computer, 15, for data processing.

In the experiments, the triggering threshold was set at 0.3 V when the switchable gain of the detector was set at the second to the minimum level (the 10 dB setting). For this experimental system, the ringdown time is on the order of μs and the time interval of the laser current modulation is 100 ms; therefore; a complete ringdown event can be observed for each laser pulse. The bandwidth of the oscilloscope used is 400 MHZ, and the peak response of the detector is 10 MHZ. These features allowed the pulsed spikes that were transmitted to the detector in each complete round trip in the fiber loop to be distinctively resolved on the ringdown waveform.

The test temperature control was achieved by using an electrical heating oven, which consists of a microprocessor-based controller (Mellen Model PS 305-120-15-S1) and an oven chamber (Mellen SC12R-0.75×6) with the highest operation temperature up to 1400° C. The step of temperature increment and the heating duration at each set temperature point can be automatically or manually controlled. The uncertainty of the temperature control is ±0.1° C. when the temperature is low, e.g., <150° C., and is better than ±0.5% of the full scale when the temperature is high, e.g., up to 1000° C. In the experiment, the section of bare fused silica single mode fiber which contained the bare FBG or LPG was loosely placed in the ceramic tube of the oven chamber so that the fiber was not subject to bending or stress in the oven. The rest of the fiber loop was coiled and laid on an optical table. The sensor head of a K-type thermocouple was deployed in the central region of the oven tube, close to but not attached to the fiber. A local thermal equilibrium was readily established, so that the displayed temperature indicated the actual grating temperature.

Example 2

Characterization of the Ringdown Behavior of Fiber Grating Loops

Figure 3:
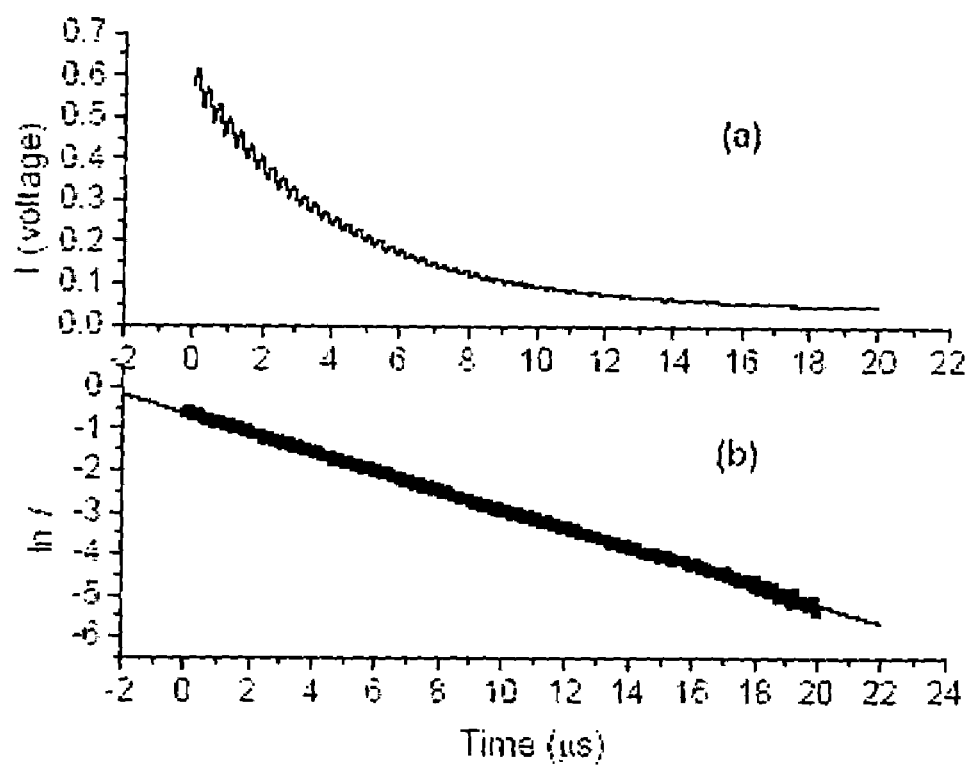
FIG. 3 shows (a) typical fiber Bragg grating loop ringdown waveform. The central wavelength of the FBG is 1566.80 nm with a bandwidth of 0.25 nm. The ringdown waveform was recorded at the laser wavelength of 1567.3 nm and the FBG temperature of 21° C. (b) The good linearity of the fitting (i.e., $R^2=0.99$) shows the single exponential decay of the waveform. The ringdown time is 4.14 µs.

FIG. 3(a) shows a typical fiber Bragg grating-loop ringdown waveform, which was recorded when the laser wavelength was tuned to 1567.30 nm, corresponding to a 0.09 dB transmission loss in the FBG. The natural logarithm of the decay waveform is fitted to a line to yield a ringdown time of 4.14 μs. The good linearity of the fitting ($R^2$=0.99) shown in FIG. 3(b) indicates that the ringdown decay waveform follows a single exponential decay. Similar evaluations of the ringdown decay behavior observed with different light transmission losses incurred in the FBG were also performed. As long as the light transmission loss that occurred in the FBG is lower than ~1 dB (79% transmittance), a single exponential ringdown decay waveform can be obtained. Excessive optical transmission loss in the fiber loop can result in no ringdown behavior or non-single exponential decay behavior. When the laser wavelength is properly tuned in the spectral bandwidth curve, e.g., away from the Bragg wavelength region, a single exponential ringdown decay waveform can be obtained in the experiment. Similar evaluation of the ringdown behavior for a fiber loop with an LPG was also performed.

The time interval between two adjacent spikes in the waveform shown in FIG. 3(a) is equivalent to the round trip time of the laser beam inside the loop. Given the known length of the fiber loop, 56 meters, and the measured round trip time, 273 ns, the averaged fiber refractive index is determined to be 1.464. Alternatively, with a known fiber reflective index, the total length of the fiber loop can be also determined from the measured round trip time, $t_r$.

Example 3

Temperature Response of the FBG Ringdown Temperature Sensor (Type I)

Figure 4:
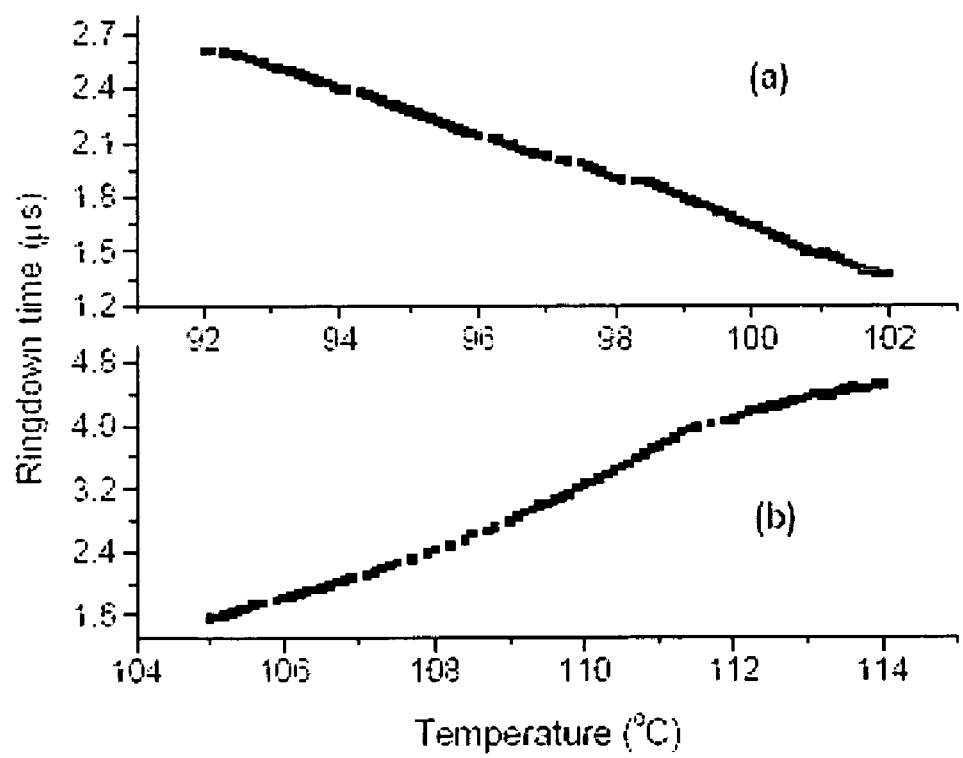
FIG. 4 shows a typical temperature response curve of the Type I sensor, in which an FBG is used as the sensing element and the temperature is measured by ringdown time. (a) The sensor is operating in Zone II; (b) the sensor is operating in Zone III. The FBG (#2) centers at 1567.66 nm.

In the Type I sensor, an FBG was spliced with a single mode fiber to form a fiber Bragg grating loop and the FBG served as the sensing element. In the experiment, the laser wavelength was tuned to 1568.11 nm, which was located at the right-hand side of the spectral bandwidth curve, Zone V in FIG. 1. When the FBG temperature increases, the whole spectral response curve shifts to the longer wavelength direction and the relative position of the laser wavelength in the bandwidth curve equivalently shifts, i.e., from points a to d as illustrated in FIG. 1. The resultant transmission loss of the laser beam increases; therefore, the measured ringdown decreases. The FBG temperature control was achieved by using the electrical heating oven system which is described in the previous section. FIG. 4 shows a typical temperature response of the Type I sensor. The ringdown measurements at each temperature were performed for approximately one minute after each individual temperature control was stabilized. FIG. 4(a) shows the sensor's temperature response in the range of 92-102° C. in which the sensor operates in Zone II in FIG. 1; the increase of the FBG temperature results in the decrease of the recorded ringdown time. FIG. 4(b) shows the sensor's temperature response in the range of 105-114° C. in which the sensor operates in Zone III in FIG. 1; the increase of the FBG temperature results in the increase of the recorded ringdown time. When the FBG temperature increased above 114° C., the measured ringdown times remained constant. The observed phenomena, shown in FIGS. 4(a) and (b), are attributed to the fact that the relative position of the laser wavelength in the spectral response curve shifts from the right-hand side (Zone II) at temperatures lower than 92° C. to the left-hand side (Zone III) at temperatures higher than 105° C. The three-degree operation gap (102-105° C.) is attributed to the fact that in the temperature range of 102-105° C. the bandwidth curve shifted to a position where the laser wavelength was relatively located in Zone I; the sensor was not operating functionally in Zone I due to the excessive optical loss. FIG. 4 shows that by using the single laser wavelength, 1568.11 nm, which can be located in different zones (Zones II or III) of the spectral response curves resulting from the shifting at different temperature regions, the sensor operates in the regions of 92-102° C. and 105-114° C., respectively.

Figure 5:
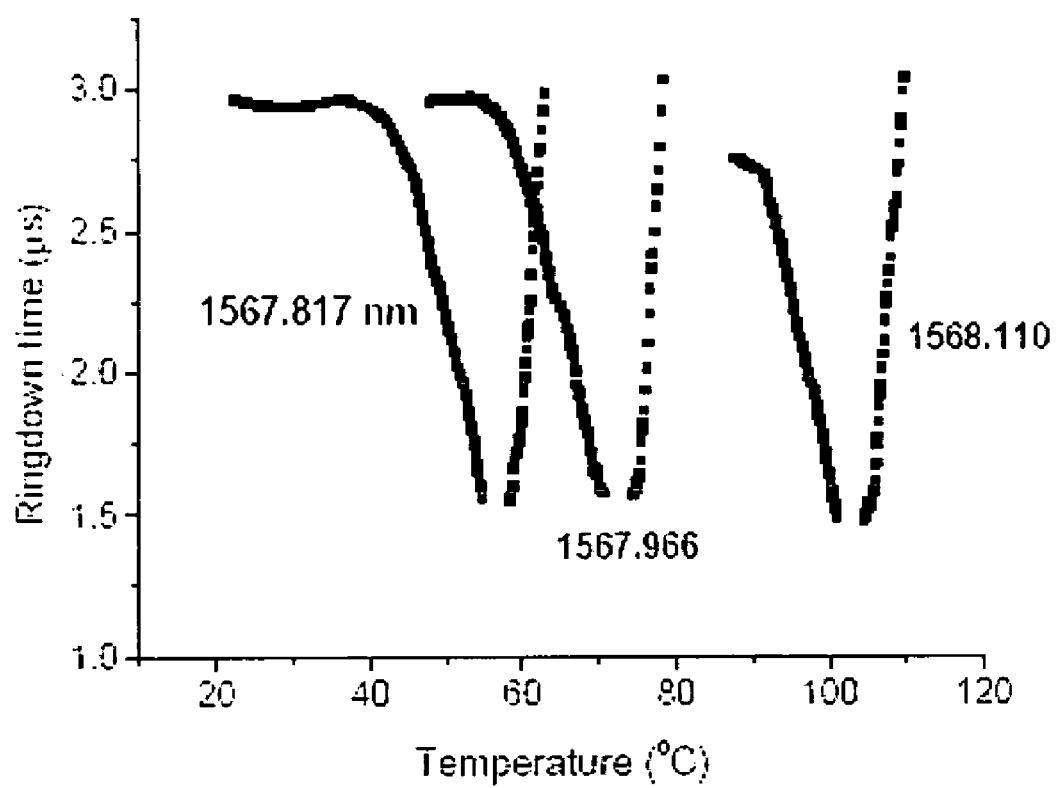
FIG. 5 demonstrates the adjustable temperature operating regions of the Type I sensor.

In principle, by tuning the laser wavelength to reset the initial location of the laser wavelength in the bandwidth curve, the FBG sensor can operate in different temperature regions, ranging continuously from room temperature to high temperature, while the sensor has the same operation bandwidth, approximately 19° C. at each individual laser wavelength. In the experiment, the laser wavelength was also tuned to 1567.817 nm and 1567.966 nm, and the sensor operated in two different temperature regions, 59-78° C. and 46-65° C., respectively, as shown in FIG. 5.

Sensitivity of the sensor depends on the shape of the bandwidth curve the FBG and the laser wavelength location in the FBG spectral response curve. If the laser wavelength used in the sensor is located in either side area of the spectral response curve, i.e., Zones IV and V in FIG. 1, where the change of the transmittance rate is insensitive to the wavelength shift resulting from a temperature change, then the sensor is less sensitive to the temperature variation. On the contrary, if the laser wavelength used is located close to the peak area of the spectral response curve, e.g., points c and d in FIG. 1, then the sensor will be very sensitive due to the fact that any small temperature variation, or, equivalently, a small shift of the curve, would result in a big change in the transmittance rate of the FBG at this wavelength. In FIG. 4(b), the measured ringdown time changed from 1.57 µs to 4.54 µs when the temperature increased from 105° C. to 114° C. The standard deviation of the ringdown time averaging over 50 ringdown events was 0.02 µs. These results yield a detection sensitivity for the temperature measurement using such a device of approximately 0.06° C., based on one ($\sigma$) deviation. In order to achieve a similar detection sensitivity with a bare silica single mode fiber with a thermal sensitivity of 0.008-0.03 nm/° C., an optical spectral analyzer (OSA) with an extremely high spectral resolution (0.00048-0.0018 nm) would be required. An OSA with such a spectral resolution could prove to be rather expensive, and difficult to obtain. The spectral resolution (or wavelength measurement accuracy) of a typical OSA is ~0.02 nm.

For a given FBGLRD temperature sensor (Type I), the ultimate detection sensitivity is only limited by thermal properties of the fiber material, rather than by the spectral measuring equipment, such as an OSA. The sensor's sensitivity can be specifically designed by using the FBG with different specifications (e.g., having select bandwidths). The smallest bandwidth of a typical, commercially available FBG written in bare silica single mode fiber is ~0.05 nm, which is approximated five-fold narrower than the one used in the Type I sensor. This implies that the detection sensitivity of the Type I sensor reported in this work can be further improved to 0.012° C. by employing such a narrow band FBG. It should be noted that pursuing an extremely high detection sensitivity of the sensors based on the FBGLRD technique requires a high accuracy, long-term stability, and narrow linewidth laser source. With respect to the detection sensitivity on the order of 0.01° C., the diode laser used in the present example can still meet the requirements. However, a highly accurate high temperature test source is required for the temperature calibration of the high sensitivity temperature sensor.

Example 4

Temperature Response of the LPG Ringdown Temperature Sensor (Type II)

In the Type II fiber grating sensor, an LPG was spliced into the fiber loop and serves as the sensing element for the LPGFLRD temperature sensor. Compared with the FBGs used in the Type I sensor, the LPGs used in the Type II sensor have a large spectral bandwidth of approximately 50 nm and a large corresponding side area (similar to Zones II and III in FIG. 1) that covers over 60 nm. Shifting 60 nm of the bandwidth curve requires a temperature change of approximately 600° C. if the thermal sensitivity of the LPGs used in the loop is assumed to be 0.1 nm/° C. In the experiments, the laser wavelength was tuned to 1567.7 nm, which was located in the side of the bandwidth curve to the longer wavelength (Zone II). Similar temperature control procedures, as described for the testing of the Type I sensor, were applied to the test of the Type II sensor. Due to the shift of the bandwidth curve that altered the relative position of the laser wavelength in the bandwidth curve, the sensor's temperature increase caused the measured ringdown time to decrease.

Figure 6:
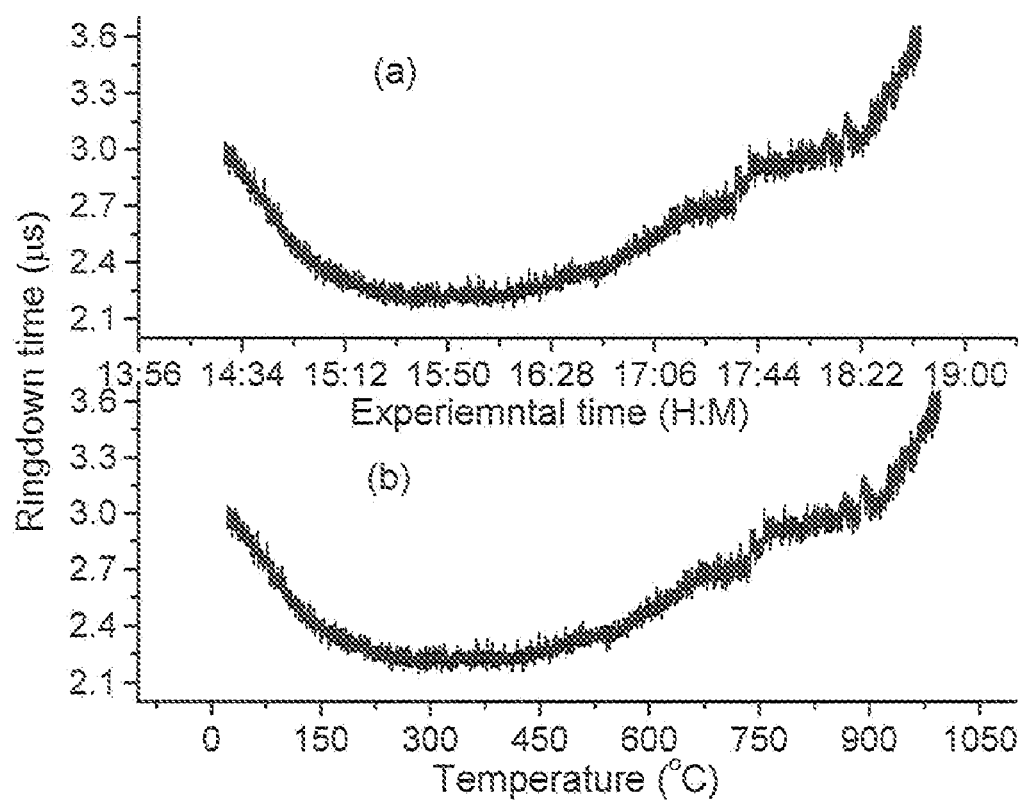
FIG. 6 shows the temperature response for a first Type II sensor. The laser wavelength was set at 1567.7 nm. (a) The measured ringdown time vs. actual experimental time (H:M) during the temperature increase from 21 to 995° C. is shown. (b) The measured ringdown time vs. temperature is shown. The temperature was converted from the actual experiment time in (a). The temperature increment rate was ~0.05-0.1° C./second.

FIG. 6 shows the temperature response of the sensor as the temperature increase from room temperature, 21° C., to 995° C. The x-axis and the y-axis in FIG. 6(a) represent the actual experiment time (hour:minute) and the measured ringdown time, respectively. Since the temperature increase rate was controlled at approximately 0.05-0.1° C./second, the LPG temperature at each experimental time indicated in the x-axis in FIG. 6(a) can be estimated and the measured ringdown time vs. temperature is shown graphically in FIG. 6(b). The temperature response curve in FIG. 6(b) does not show a sole directional response of the recorded ringdown time as a function of temperature. The left-hand portion shows that the ringdown time decreases from 3.0 μs to 2.2 μs when the temperature increases from 21° C. to 350±50° C. After the turning point, 350±50° C., further increases of the temperature to 995° C. results in the increase of the ringdown time from 2.2 μs to 3.6 μs as shown in the right-hand portion of the curve in FIG. 6(b).

The temperature response shown in the left-hand of the curve indicates that the sensor device is operating in the half of the bandwidth curve to the long wavelength side, temperature increase results in the increase of LPG insertion loss from 0.1 dB in the wing area to 6.8 dB in the peak area. After the turning point (change to the other half of the bandwidth curve to the short wavelength side), the temperature increase shifts the bandwidth curve and results in the decrease of the LPG insertional loss. Therefore, the increase in ringdown time was observed. The asymmetric behavior of the response curves in FIG. 6 is partially due to the non-constant temperature increase rate and to the asymmetric shape of the bandwidth curve itself.

Figure 7:
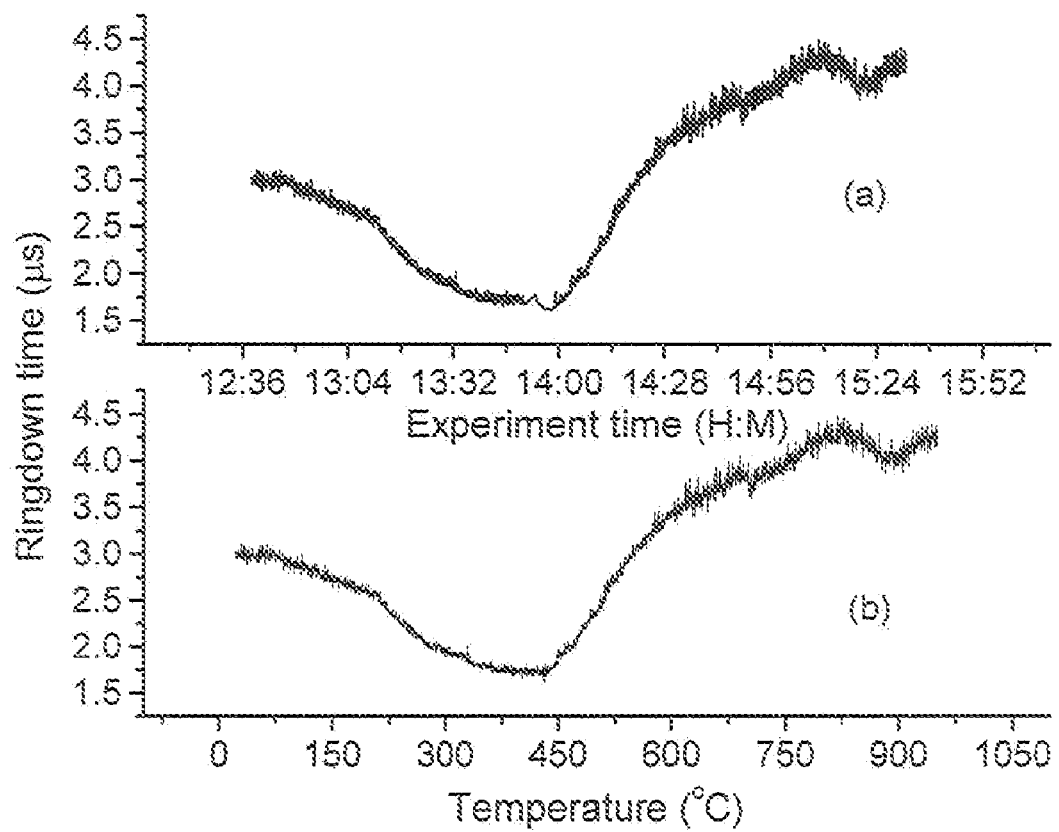
FIG. 7 shows the temperature response for a second Type II sensor. The laser wavelength was set at 1567.7 nm. (a) The measured ringdown time vs. actual experimental time (H:M) during the temperature increase from 21 to 950° C.; (b) the measured ringdown time vs. temperature. The temperature was converted from the actual experiment time in (a). The temperature increment rate was ~0.1-0.15° C./second.

To repeat this experiment, the second LPG was used to replace the first LPG in the fiber loop unit to test the sensor's temperature response. Using the same temperature control procedures, a similar temperature response curve of the device was obtained, as shown in FIG. 7. The temperature response curve in FIG. 7(b) shows that the ringdown time decreases from 3.0 μs to 1.7 μs when the temperature increases from 21° C. to 400±20° C. The further increase of the temperature from this turning point to 950° C. results in the ringdown time increase from 1.7 μs to 4.5 μs, respectively. The differences between the two curves in FIGS. 6(b) and 7(b) and the difference between the left-hand and the right-hand portions of each individual curve in FIGS. 6(b) and 7(b) are due to differences of the specifications of the two gratings (see Table 3) and the non-constant temperature increment rate.

Figure 8:
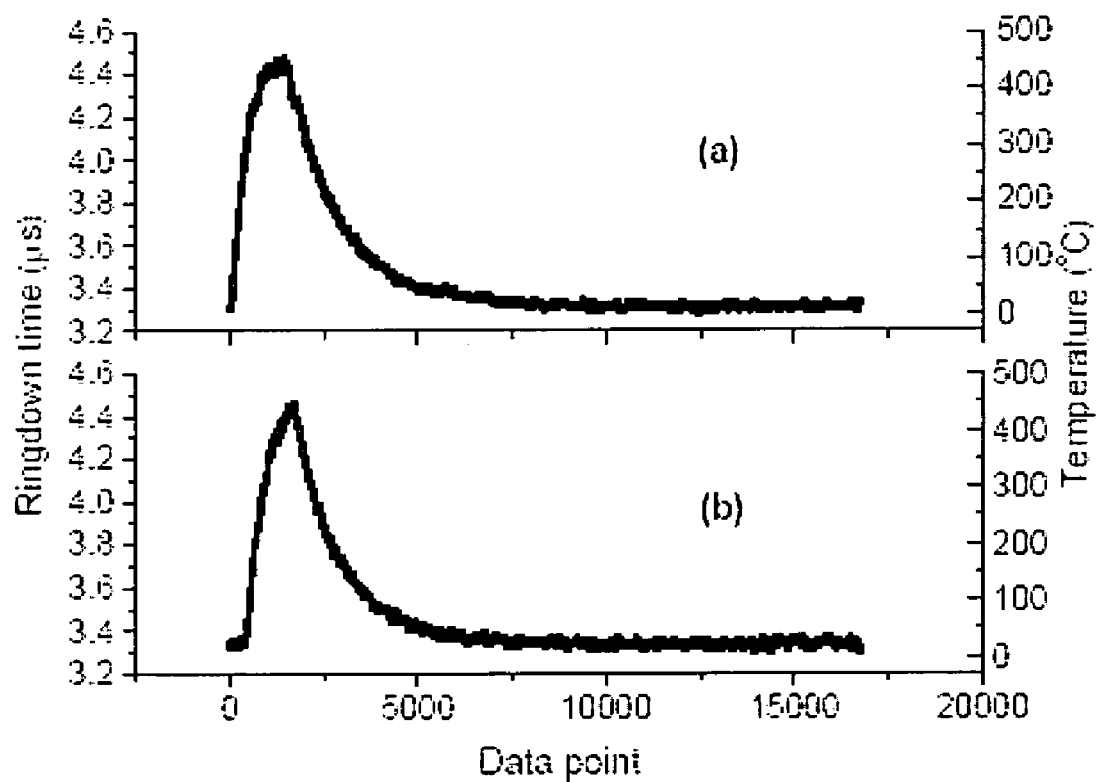
FIG. 8 shows a temperature response curve of a Type II sensor, where the sensor has been subjected to an initial high temperature testing. The left hand portion of the curve shows the sensor's response to the temperature increase from 21 to 450° C. through the heating process; the right-hand portion shows the sensor's response to the temperature decrease from 450-21° C. through the natural cooling process. (a) and (b) demonstrate good repeatability of the sensor.

The ringdown times dropped from 3.0 μs to 1.7 μs when the temperature increased from 21° C. to 450° C.; and the ringdown times increased from 1.7 μs to 4.7 μs when the temperature further increased from 450° C. to 995° C. To repeat the experiment, the LPG was heated up from room temperature to 995° C. and cooled down to room temperature for many cycles. Interestingly, the observed sensor's response in the repeated experiments was different from the one observed in the initial testing. In the repeated experiments, the sensor only responded in the temperature range of 21-450° C., rather than whole initial testing range, 21-995° C.; and the sensor showed good repeatability in the subsequent heating/cooling cycles in the temperature range of 21-450° C. FIG. 8 shows the sensor's temperature response and repeatability after the sensor was subject to the initial high temperature testing. Good repeatability can be seen by comparing FIGS. 8(a) and (b). The left-hand portion of the curves in FIGS. 8 (a) and (b) shows the measured ringdown increases from 3.3 μs to 4.5 μs when the temperature increases from 21° C. to 450° C. The right-hand portion of the curves in FIGS. 8(a) and (b) shows the sensor's response when the temperature was naturally cooled down from 450° C. to 21° C. and stabilized at 21° C. (room temperature). The asymmetric behavior in each curve shown in FIGS. 8(a) and (b) is due to the different temperature control processes, the rapid heating up and the slow cool down. When the temperature changed above 450° C., e.g., heated up from 450° C. to 995° C., or naturally cooled down from 995° C. to 450° C., the measured ringdown times remained constant. These features of the temperature responses were not observed in the initial single testing when the LPG was heated up to 995° C.

Figure 9:
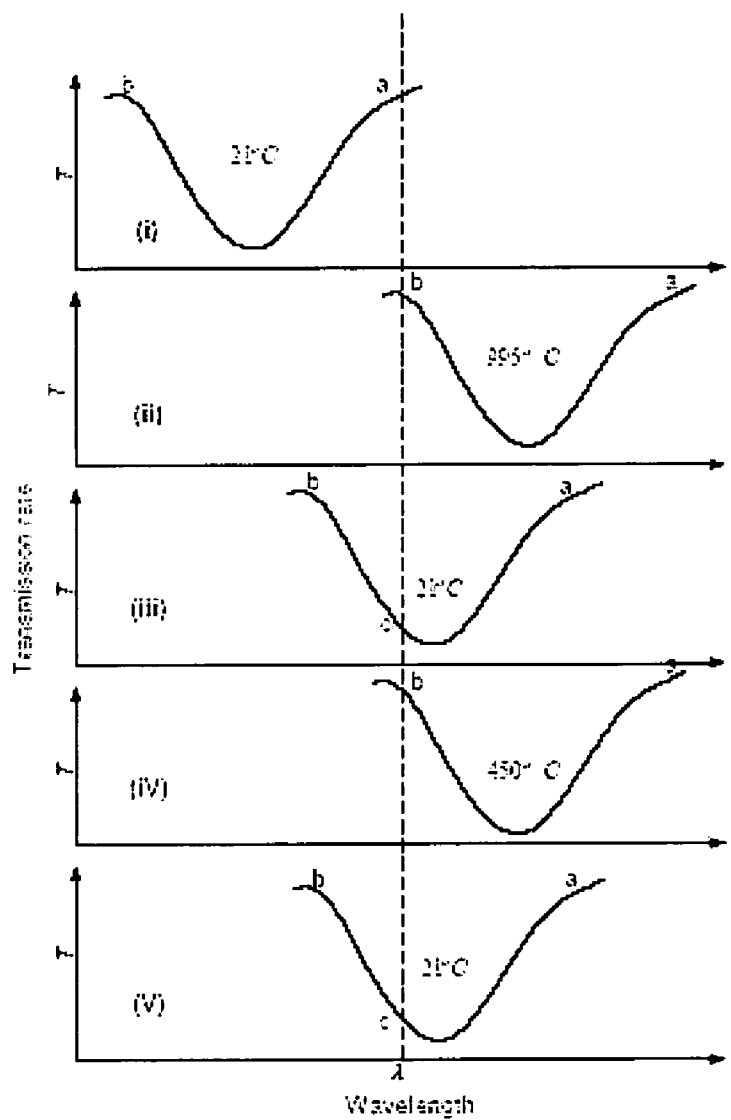
FIG. 9 illustrates the changes in thermal properties of an LPG during the different temperature processing steps. From (i) to (ii), the high temperature testing serves as the annealing process which permanently modifies the thermal properties of the LPG. From (iii) to (v), the LPG shows the stable and reversible thermal properties after the annealing process.

The different temperature responses observed between the initial and the subsequent repeated tests for reproducibility can be explained by the thermal properties of the LPG. The sensor's performance is tentatively explained by the changes of the thermal properties of the LPG, which are illustrated in FIG. 9. After the initial heating and cooling process, from steps (i) through (iii) in FIG. 9, the grating shows irreversible thermal properties. When the temperature cools down to 21° C. from 995° C., the bandwidth curve does not shift back to the initial position which is shown in FIG. 9 (i), instead, it permanently stabilizes in a new stage shown in FIG. 9 (iii). This permanent thermal modification changes the relative location of the laser wavelength from point a in the bandwidth curve shown in (i) to point c shown in (iii) at room temperature. From this new stage, temperature increase from 21° C. results in an increase in the ringdown time, shown in the left-hand portion of the curve in FIG. 8, since the bandwidth shift that resulted from the temperature increase decreases the optical transmission loss in the LPG. This is different from the temperature response observed in the initial testing in which the relative location of the laser wavelength was located in the right half of the curve. Once the thermal properties are stabilized, the grating shows reproducible thermal properties, i.e., from steps (iii) to (v). The change of thermal properties of the LPG can be explained by the annealing effect that resulted from the initial heating and cooling process, which permanently alters the thermal property of the LPG. Therefore, the same change of the temperature does not result in the same shift of the bandwidth curve between the first annealing process and the post-annealing heating process. This annealing effect was not observed in the Type I sensor, in which the thermal properties of the FBG showed an excellent stability and repeatability. Nevertheless, even with the aforementioned characteristics, the Type II sensor demonstrates distinctive response to changes in temperature up to 995° C. and shows reproducible operation in the range of 21-450° C. Furthermore, by employing different types of fiber materials from which LPGs are made, Type II sensors with a higher measuring range can be developed.

The detection sensitivity of the Type II sensor can be estimated from FIG. 8. When the temperature changes 429° C., the observed change in ringdown time is 1.5 μs. The typical baseline noise for the Type II sensor is 1.5% by averaging over 50 ringdown events. This yields an average-detection sensitivity of 7° C. for the device examined in this experiment. Compared with the detection sensitivity and the measuring range of the Type I sensor, this LPG sensor may be tentatively defined as a large measuring range but low sensitivity Type II sensor.

Example 5

Temperature Tolerance of the Type I and II Sensors

Figure 10:
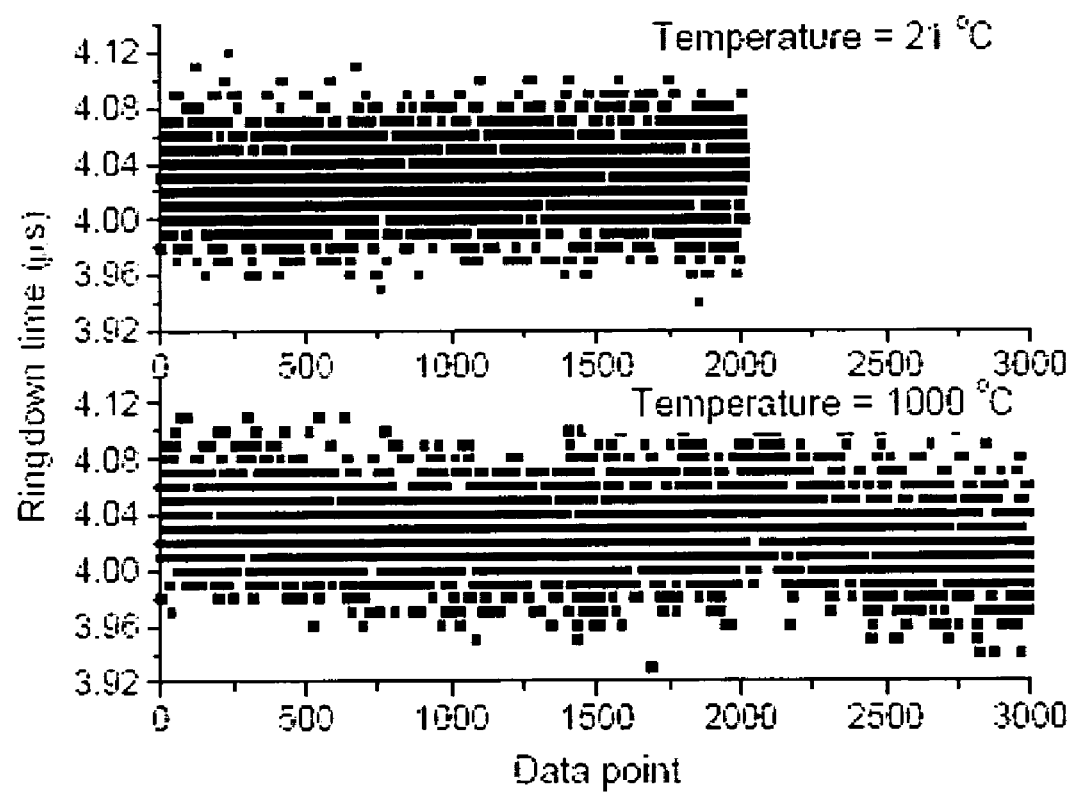
FIG. 10 demonstrates the ruggedness of the sensors (Type I) through scanning the ringdown baseline noise at different temperatures. (a) The baseline noise: 0.67%; (b) the baseline noise: 0.72%. No noticeable degradation of the sensors was observed at high temperature (<1000° C.).

The high temperature tolerance of the Type I sensor was tested by the evaluation of the physical damage of the sensing element—the bare FBG. In the experiment, the testing was performed by evaluating a long-time scan of the ringdown baseline at 1000° C. If the physical properties of the FBG degrade, such as the softening of the section of the fiber, then the total optical transmission loss in the fiber loop changes; this would cause the recorded ringdown time to change, which would be reflected in the ringdown baseline noise. The baseline noise is defined as $\Delta\tau/\tau$, where $\Delta\tau$ is the standard deviation of ringdown time and $\tau$ is the averaged ringdown time. FIG. 10 shows two typical scans of the baseline noise recorded at 21° C. and 1000° C., respectively. The measured baseline noises in FIG. 10 are 0.67% at 21° C. and 0.72% at 1000° C., respectively. This result indicated that the sensor device was not damaged at 1000° C. The ruggedness of the sensor was examined through repeatedly switching the testing temperatures between room temperature and 1000° C. Additionally, a single seven-hour non-stop scan of the ringdown baseline at 1000° C. showed no physical damage of the sensing element. A slightly thermal softening effect on the section of the fiber that was placed in the oven tube was observed when the temperature was above 1000° C. Although the ringdown events were still observed, the recorded ringdown times gradually decreased with the increase of the temperature. The sensing element was damaged at 1319° C. by the severe thermal softening effect, which resulted in an apparent distortion of the section of the fiber. The section of the fiber was not broken, but the ringdown event stopped. The reversibility of the thermal properties of the sensor was also tested. After several cycles of heating the sensing element from room temperature to 1000° C., similar response curves as shown in FIG. 5 in terms of the ringdown time changes and the operation temperature regions were still obtained. The Type I sensor shows stable and reversible thermal properties in the examined operation regions.

For the Type II sensor, the sensing element, the LPG, was also tested in high temperatures. Except having the permanent thermal modification resulting from the annealing process, the LPGs also showed stable and reversible thermal properties, which were reflected in the baseline scans.

Potential advantages of the temperature sensors disclosed in the present invention compared with the current optical fiber temperature sensors are the high detection sensitivity (Type I sensor), large measuring dynamic range (Type II sensor), and low costs (both). Further, the fiber grating loop ringdown temperature sensors utilize an inexpensive photodetector for the signal monitoring followed by a fast ringdown data processing routine (less than one second). Finally, without using chemical coatings, optical cavity, and/or fine optical components in the sensor head, this type of sensors offers superior ruggedness. These qualities will further enhance the attractiveness of these types of sensors in real applications.

Example 6

Fiber Grating Loop Ringdown Temperature Sensor Under Cryogenic Conditions

Figure 11:
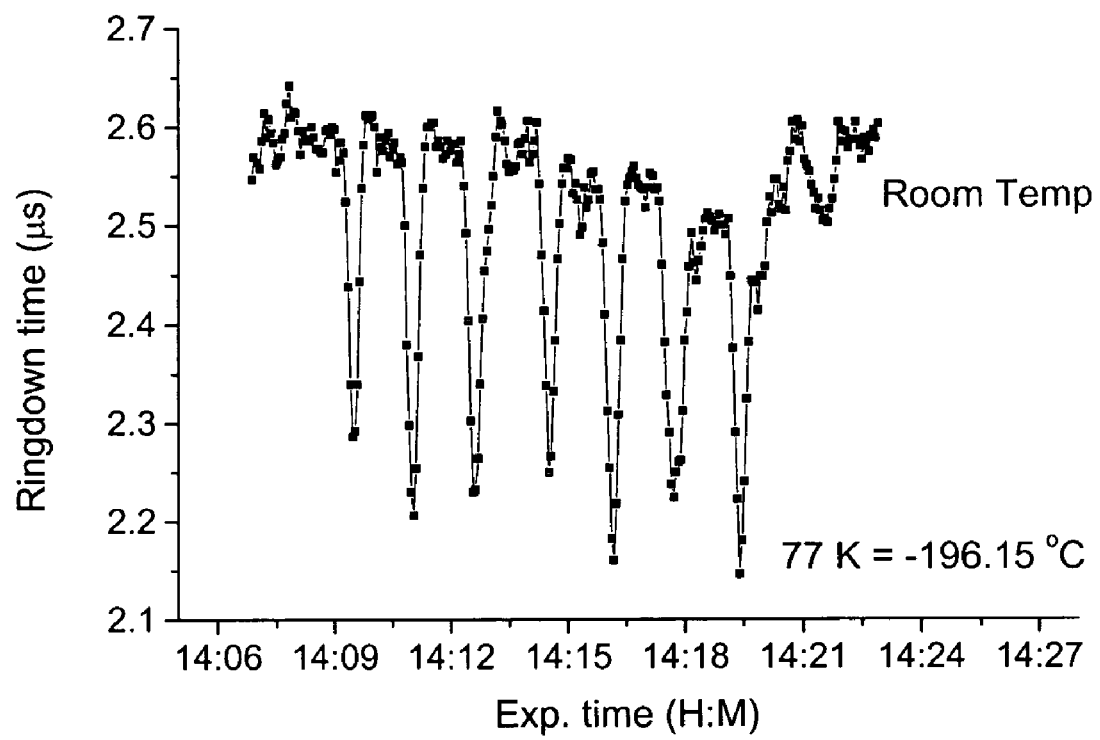
FIG. 11 demonstrates the repeatability and fast response of the fiber grating loop ringdown temperature sensor working under cryogenic conditions. The sensing element of the sensor unit is an FBG.

The fiber grating loop ringdown temperature sensor demonstrates repeatable and fast response under cryogenic conditions (FIG. 11). In this experiment, the sensor head was an FBG. The sensor head was bathed with liquid nitrogen to cool down to −196° C. The section of the fiber on which the FBG is written was taped in a dish. To cool down the sensor head, a small amount of liquid nitrogen (~½ cup) was poured onto the sensor head. The observed ringdown time drops. After ~tens of seconds, the liquid nitrogen evaporated to the atmosphere in the lab, and the temperature of the sensor returned to room temperature. This observed ringdown time increased back. The procedure was repeated in order to obtain the data in FIG. 11. A step-by-step low temperature measurement can be done if a low temperature calibration source is available.

All of the devices and methods disclosed and claimed herein can be made and executed without undue experimentation in light of the present disclosure. While the devices and methods of this invention have been described in terms of illustrative embodiments, it will be apparent to those of skill in the art that variations may be applied to the devices, methods and in the steps or in the sequence of steps of the methods described herein without departing from the concept, spirit and scope of the invention. More specifically, it will be apparent that certain devices which are both functionally and structurally related may be substituted for the devices described herein while the same or similar results would be achieved. Although the invention has been described with reference to the above examples, it will be understood that modifications and variations are encompassed within the spirit and scope of the invention.

REFERENCES

1. K. T. V. Grattan and B T Meggitt, Optical Fiber Sensor Technology, Volumes III and IV, 1999, Kluwer Academic Publisher, Boston, Mass.
2. J. Greenwood and G Dobre, Proc SPIE, 2000, 4075:94.
3. R. Kashyap, Fiber Bragg Gratings, 1999, Academic Press, San Diego, Calif.
4. C. Wang and ST Scherrer, Opt Lett, 2004, 29:352.
5. C. Wang, U.S. Patent Application (pending) #03-0905-61 (2003).
6. A. O'Keefe and DAG Deacon, Rev Sci Instrum, 1988, 59:2544.
7. K. K. Lehmann, U.S. Pat. No. 5,528,040.
8. D. Romanini et al., Chem Phys Lett, 1997, 264:316.
9. B. A. Paldus et al., J Appl Phys, 1997, 82:3199.
10. A. C. R. Pipino et al., Rev Sci Instrum, 1997, 68:2978.
11. T. von Lerber and M W Sigrist, Appl Opt, 2002, 41:3567.
12. M. Gupta et al., Opt Lett, 2002, 27:1878.
13. G. Stewart et al., Meas Sci Technol, 2001, 12:843.
14. R. S. Brown et al., J Chem Phy, 2002, 117:10444.
15. P. B. Tarsa et al., Passive optical fiber resonator for cavity ring-down spectroscopy, Abstracts for Papers, 224$^{th}$ ACS National Meeting, Boston, Mass., U.S., Aug. 18-22, 2002.
16. C. Wang and ST Scherrer, Appl Opt, 2004, 43:6458-6464.
17. T. Mizunami et al., Mes Sci Technol, 2001, 12:914.
18. Y. Shen et al., Rev Sci Instrum, 2004, 75:1006.
19. S. Pal, et al., Rev. Sci. Instrum. 2004, 75:1327.
20. S. Trpkovski, et al., Opt. Lett. 30, 2005, 30:607.
21. Y. Zhu, et al., Opt. Lett. 2005, 30:711.
22. X. Wan, et al., Opt. Lett. 2002, 27:1388.
23. C. Wang, "Fiber ringdown temperature sensors", Opt. Eng. Lett. 2005, 44:3.
24. S. W. James, et al., Meas. Sci. Technol. 2003, 14:R49.
25. C. Wang, et al., "Fiber ringdown temperature sensor: Using a fiber grating as the sensor element", (to be published).

What is claimed is:

1. A method of determining temperature by measuring fiber grating loop ringdown comprising:
   a) exposing a grating of an apparatus to an environment which exhibits variation in temperature, the apparatus comprising a coherent light source, a first coupler configured to receive light from said light source, a second coupler, a detector connected to said second coupler, a data acquisition system connected to said detector, and a first fiber grating, wherein the first and second couplers are in optical communication with each other along two or more light paths, and wherein at least one light path comprises said first fiber grating, the light paths being configured such that at least one fiber grating loop is formed between said first and said second coupler;

b) emitting a light pulse into the fiber grating loop; and c) measuring an observed ringdown time for the light pulse.

2. The method of claim 1, further comprising tuning laser wavelength to affect a sensor property selected from the group consisting of accuracy, sensitivity, and dynamic measuring range.

3. The method of claim 2, wherein said tuning adjusts the temperature range of the sensor.

4. The method of claim 1, further comprising measuring optical transmission loss resulting from temperature changes.

5. The method of claim 1, further comprising measuring levels of total optical transmission loss in the fiber grating loop.

6. The method of claim 1, wherein the fiber grating loop comprises a fiber-Bragg grating.

7. The method of claim 1, wherein the fiber grating loop comprises a long period grating.

8. The method of claim 1, wherein the wing areas of the fiber grating are used as the wavelength dependent attenuator of the light transmission.

9. The method of claim 1, wherein the detection sensitivity is modulated by selecting the area of the grating bandwidth.

10. The method of claim 9, wherein bandwidth selection is determined by the wavelength of the light source.

11. The method of claim 1, wherein the ringdown time ($\tau$) is calculated using the formula:

$$\tau = \frac{nL}{cA'}\left(1 - \frac{\beta(\lambda)}{A'}T\right)$$

where T is a given temperature, $\lambda$ is a fixed laser wavelength, $\tau$ is the ringdown time, L is the total fiber length, c is the speed of light in a vacuum, n is the refractive index of the fiber, A' is the addition of the total loss in each round trip and the fiber-to-fiber splice losses at the two connection points, and $\beta(\lambda)$ is the wavelength dependent temperature coefficient of the grating induced insertion loss.

12. The method of claim 1, wherein the ringdown signal is measured by the detector.

13. The method of claim 1, wherein ringdown time is calculated and recorded by the data acquisition system.

14. The method of claim 1, wherein the sensor is remote from the data acquisition system and the detector.

* * * * *